US005445015A

United States Patent [19]

Namiki et al.

[11] Patent Number: 5,445,015

[45] Date of Patent: Aug. 29, 1995

[54] METHOD AND APPARATUS OF DETECTING FAULTS FOR FUELS EVAPORATIVE EMISSION TREATMENT SYSTEM

[75] Inventors: Koichi Namiki; Takuya Matsumoto; Toru Hashimoto, all of Kyoto; Yasuhisa Yoshida, Okazaki, all of Japan

[73] Assignee: Mitsubishi Jidosha Kogyo Kabushiki Kaisha, Tokyo, Japan

[21] Appl. No.: 80,718

[22] Filed: Jun. 24, 1993

[30] Foreign Application Priority Data

Jun. 26, 1992 [JP] Japan ................................ 4-169067

[51] Int. Cl.[6] ........................................ G01M 19/00

[52] U.S. Cl. .................................. 73/118.1; 123/520

[58] Field of Search ............... 73/118.1; 123/520, 521, 123/519, 518

[56] References Cited

U.S. PATENT DOCUMENTS

| | | | |
|---|---|---|---|
| 5,143,035 | 9/1992 | Kayanuma | 123/520 |
| 5,158,054 | 10/1992 | Otsuka | 123/520 |
| 5,191,870 | 3/1993 | Cook | 123/520 |
| 5,261,379 | 11/1993 | Lipinski et al. | 123/520 |

FOREIGN PATENT DOCUMENTS

| | | |
|---|---|---|
| 2681098 | 3/1993 | France . |
| 4012111 | 3/1991 | Germany . |
| 9112426 | 8/1991 | Germany . |
| 4505491 | 9/1992 | Japan . |
| 2254318 | 10/1992 | United Kingdom . |

*Primary Examiner*—Richard E. Chilcot, Jr.
*Assistant Examiner*—James M. Olsen

[57] ABSTRACT

A method and apparatus of detecting faults for a fuel evaporative emission treatment system, in which the fuel evaporative emission which is admitted from a fuel tank and absorbed once by a canister is separated from the canister by purge air and sucked in a suction pipe of an engine. Under the control of an electronic control unit, a vent port of the canister is closed by closing a vent solenoid valve, and a purge control valve installed in a pipe connecting an outlet port of the canister to the suction pipe is opened. Thereby, a negative pressure of suction air is applied to the fuel tank via another pipe connecting the above-mentioned pipe and the inlet port of canister to the fuel tank to reduce the internal pressure of the fuel tank. Then, the reduction of the internal pressure of the fuel tank is completed by closing the control valve. Afterward, the pressure rise generated in the fuel tank from the time when the exhaust is completed is detected on the basis of the output of a pressure sensor. If the degree of pressure rise is high, it is judged that the fuel evaporative emission system has a fault such as poor airtightness.

18 Claims, 7 Drawing Sheets

METHOD AND APPARATUS OF DETECTING FAULTS FOR FUELS EVAPORATIVE EMISSION TREATMENT SYSTEM

BACKGROUND OF THE INVENTION

The present invention relates to a method and apparatus of detecting faults for a fuel evaporative emission treatment system and, more particularly to a method of precisely detecting the airtightness of a fuel tank.

In general, automobiles emit harmful substances such as carbon monoxide, nitrogen oxides, and hydrocarbon. For example, unburned hydrocarbon (HC) gas contained in blowby gas or exhaust gas is emitted to the atmosphere as HC, and crude gasoline (fuel evaporative emission) evaporating in a fuel tank or the like is dissipated into the atmosphere. Therefore, automobiles are equipped with a device for controlling or suppressing the emission of harmful substances, such as an exhaust gas purification device or a fuel evaporative emission treatment system.

The fuel evaporative emission treatment system, which prevents the dissipation of fuel evaporative emission into the atmosphere, is typically provided with a canister having activated charcoal for adsorbing HC. The canister has an inlet port communicating with the fuel tank, an outlet port communicating with the suction pipe of engine, and a vent port which is open to the atmosphere. In the canister storage type fuel evaporative emission treatment system of this kind, fuel evaporative emission (HC) in the fuel tank is admitted into the canister when engine is not in operation, and adsorbed by activated charcoal in the canister. As the engine is run subsequently, a negative pressure of the suction air produced in the suction pipe acts on the outlet port to admit purge air through the vent port, so that HC absorbed by the activated charcoal is separated from the activated charcoal by the purge air, and the separated HC is discharged to the suction pipe together with the purge air. The HC (fuel evaporative emission) discharged into the suction pipe burns together with the air-fuel mixture in the engine cylinder, thereby preventing the dissipation of fuel evaporative emission into the atmosphere.

The canister storage type treatment system is classified into two types: One is a manifold port purge type in which a small hole for admitting fuel evaporative emission into the suction pipe is formed in the suction pipe on the downstream side from the throttle valve. The other is a throttle port purge type in which the small hole is formed in the suction pipe at a position such that the small hole is located on the downstream side from the throttle valve when the throttle valve is opened by a predetermined degree of opening or more from the fully closed position.

The fuel tank system consisting of a fuel tank, pipes, hoses and the like sometimes becomes incompletely airtight. For example, the airtightness around the fuel cap may be incomplete, or a small hole may be formed in the fuel tank body. If the fuel tank system is incompletely airtight in this manner, fuel evaporative emission dissipates into the atmosphere. In particular, if fuel evaporative emission cannot be admitted into the canister from the fuel tank due to the clogging of the purge passage connecting the inlet port of canister to the fuel tank caused for any reason, fuel evaporative emission becomes liable to be dissipated via a non-airtight (leak) portion of the fuel tank system.

If fuel evaporative emission cannot be discharged to the suction pipe from the canister due to the clogging of the purge passage connecting the outlet port of canister to the suction pipe, fuel evaporative emission is admitted into the canister from the fuel tank exceeding the HC adsorption limit of activated charcoal. In this case, fuel evaporative emission is dissipated into the atmosphere from the vent port while the vent port of canister is open.

Even if fuel evaporative emission is dissipated into the atmosphere in such a manner, the operation of engine is not affected. Therefore, the driver does not perceive this abnormality, so that he/she leaves the abnormal condition as it is, thereby fuel evaporative emission continuing to be dissipated into the atmosphere.

To solve the above problem, systems and methods of detecting the abnormality of the fuel evaporative emission treatment system have been proposed. Typically, an alarm is given when the abnormality of the treatment system is detected, and the driver takes a proper measure in accordance with this alarm, thereby the dissipation of fuel evaporative emission into the atmosphere being inhibited.

For example, Japanese Patent Publication No. 505491/1992 corresponding to International Publication No. W0091/12426 discloses an automotive tank venting device and a method of inspecting its proper function. This device is provided with an adsorption filter connected to the fuel tank via a filter pipe, and a valve pipe connecting the adsorption filter to the suction pipe of internal combustion engine. The vent pipe of adsorption filter has a shutoff valve, and the valve pipe has a tank vent valve. The above-mentioned inspection method comprises a step in which the tank vent valve is opened with the vent pipe being shut off, and a step in which whether a negative pressure is produced in the fuel tank or not is determined. If the difference between the atmospheric pressure and the internal pressure of the fuel tank exceeds a predetermined threshold, and therefore a negative pressure is produced in the fuel tank, it is judged that the device functions normally. That is to say, if a negative pressure is produced in the fuel tank, it is judged that the filter pipe and the valve pipe (corresponding to the aforesaid purge passage) are not clogged and that the tank vent valve or the device is airtight. If a negative pressure is not produced in the fuel tank, fault information is sent.

With the method disclosed in Japanese Patent Publication No. 505491/1992, the airtightness of the fuel tank system including a fuel tank, a filter pipe (purge passage), a tank vent valve (purge control valve) and the like can be determined to a considerable degree. Specifically, when the airtightness of the fuel tank system decreases to a degree such that the internal pressure of the tank exceeds the threshold Just after a negative pressure is introduced, poor airtightness can be detected. If the degree of poor airtightness is small, the internal pressure of the tank does not exceed the threshold by the time when the airtightness is determined; therefore, poor airtightness is not detected. Even if the airtightness is slightly poor, fuel evaporative emission is dissipated into the atmosphere.

The value of negative pressure of suction air produced in the suction pipe of engine, and in turn the value of a negative pressure produced in the fuel tank when the introduction of negative pressure is completed vary depending on the degree of airtightness of the fuel tank system and the operating condition of the engine. It is therefore actually difficult to set the threshold in such a manner that the airtightness can be determined precisely in various tank airtightness conditions and engine operating conditions. In particular, if the threshold is set in such a manner that slightly poor airtightness can be detected, the airtightness is sometimes judged to be poor despite the fact that the airtightness is actually good, depending on the engine operating condition at the time when the airtightness is judged.

To introduce a negative pressure for determining the airtightness, the vent pipe must be shut off (the vent port of canister must be closed) as described above. Therefore, as a negative pressure is introduced, fuel evaporative emission is sucked into the suction pipe. In other words, the air-fuel mixture supplied to the engine when a negative pressure is introduced in the fuel tank is enriched excessively by the effect of the fuel evaporative emission supplied into the suction pipe from the fuel tank. If such an excessively rich mixture is supplied to the engine operated in an operation range in which the amount of suction air is small, there occurs unstable combustion, which causes fluctuation in engine output torque, and other problems.

OBJECT AND SUMMARY OF THE INVENTION

An object of the present invention is to provide a method and apparatus for precisely detecting faults, particularly the airtightness of fuel tank, for a fuel evaporative emission treatment system.

Another object of the present invention is to provide a method and apparatus for detecting faults for a fuel evaporative emission treatment system, which is capable of reducing fluctuation in engine output torque which would be otherwise caused by the fuel evaporative emission sucked by the engine when the presence/absence of a fault is determined.

To achieve the above objects, the present invention provides a method and apparatus for detecting faults for a fuel evaporative emission treatment system in which the fuel evaporative emission in a fuel tank is adsorbed by a canister, and the fuel evaporative emission, separated from the canister by admitting atmospheric air into the canister through a vent port of the canister during the subsequent engine operation, is fed to a suction pipe of the engine. This fault detecting method comprises the steps of exhausting or evacuating the fuel tank; detecting the change in internal pressure of the fuel tank after the fuel tank is exhausted or the internal pressure of the fuel tank is reduced; and judging whether the fuel evaporative emission treatment system has a fault on the basis of the detected change in internal pressure of the fuel tank.

Preferably, the step of exhausting the fuel tank or reducing the internal pressure of the fuel tank includes sub-steps of closing the vent port of the canister; opening a control valve installed in a first passage means connecting an outlet port of the canister to the suction pipe, so that the gas in the fuel tank is exhausted via the first passage means and a second passage means connecting an inlet port of the canister to the fuel tank; and closing the control valve to complete the exhaust or evacuation of the fuel tank.

Preferably, the control valve is closed when a predetermined time elapses from the point of time when the control valve is opened. Otherwise, the control valve is closed if the internal pressure of the fuel tank decreases to a predetermined pressure which is lower than the atmospheric pressure as the fuel tank is exhausted or evacuated.

Preferably, the elapsed time is measured from the point of time when the exhaust of the fuel tank is completed to the point of time when the internal pressure of the fuel tank increases by a predetermined value from the pressure value just after the exhaust is completed, and it is judged that the fuel evaporative emission treatment system has a fault if the elapsed time is shorter than a predetermined time. Otherwise, the internal pressure of the fuel tank at the point of time when a set time elapses from the point of time when the exhaust is completed is detected and it is judged that the fuel evaporative emission treatment system has a fault if the internal pressure of the fuel tank which is detected when the set time elapses exceeds the internal pressure of the fuel tank which is detected just after the exhaust is completed by a predetermined value or more.

Preferably, if the engine is judged to be operated in a particular operating condition, the vent port is closed and the control valve is opened. More preferably, if the engine load detected on the basis of, for example, the degree of opening of a throttle valve is over a predetermined level, the engine is judged to be operated in the particular operating condition.

The advantage of the present invention is that it is judged whether the fuel evaporative treatment system has a fault on the basis of the change in internal pressure of the fuel tank detected after the fuel tank is exhausted, by which the presence of fault, in particular poor airtightness, in the fuel evaporative emission treatment system can be detected precisely.

According to the present invention, the change in internal pressure (the difference between the internal pressure of the fuel tank at the time when the detection of the change in internal pressure is started and the internal pressure of the fuel tank at the time when the detection of the change in internal pressure is completed) is used as a fault detection parameter, so that the effect of the engine operating condition on the internal pressure of the tank at the detection start time and the effect of the engine operating condition on the internal pressure of the tank at the detection completion time are compensated with each other, thereby the effect of the engine operating condition on the fault detection parameter being reduced. Also, the errors in detecting faults caused by the variation in tank exhaust condition due to the presence of fault in the fuel evaporative treatment system are eliminated. Therefore, the criterion for detecting system faults can be set to a value such that a minor system fault can be detected, by which the presence of a system fault can be detected more precisely.

According to the particular mode or aspect of the present invention, in which the fuel tank is exhausted or evacuated by once opening the control valve installed in the passage means connecting the outlet port of the canister to the suction pipe, the method of the present invention can be carried out by merely installing a control valve in the existing fuel evaporative emission treatment system. In this case, a special-purpose evacuation system or the like for carrying out the present invention is not needed.

According to the particular mode of the present invention, in which the exhaust or evacuation of the fuel tank is performed for a predetermined period of time, or the exhaust is completed when the internal pressure of the fuel tank decreases to a predetermined pressure which is lower than the atmospheric pressure as the fuel tank is exhausted, the fuel tank can be exhausted surely, and the initial condition (exhaust condition) in fault detection can be kept substantially constant, thereby the accuracy of system fault detection being improved.

According to the particular mode of the present invention, in which a fault is detected on the basis of the change in internal pressure of the fuel tank caused by the point of time when a set time elapses from the point of time when the exhaust of the fuel tank is completed or on the basis of the elapsed time from the point of time when the exhaust of the fuel tank is completed to the point of time when the internal pressure of the fuel tank increases by a predetermined value, a fault can be detected surely when a state is reached in which a change in internal pressure of the tank which can represent the presence/absence of a system fault and the degree of fault occurs, thereby the accuracy of system fault detection being improved.

According to the particular mode of the present invention, in which the exhaust of the fuel tank, the detection of the change in internal pressure, and the detection of faults are performed as long as the engine is operated in a particular operating condition, the fluctuation in engine output torque caused by the fuel evaporative emission sucked by the engine when the presence/absence of faults is determined can be reduced.

DETAILED DESCRIPTION

A method and apparatus for detecting faults for a fuel evaporative emission treatment system in accordance with a first embodiment of the present invention will be described below with reference to FIGS. 1 through 4.

Figure 1:
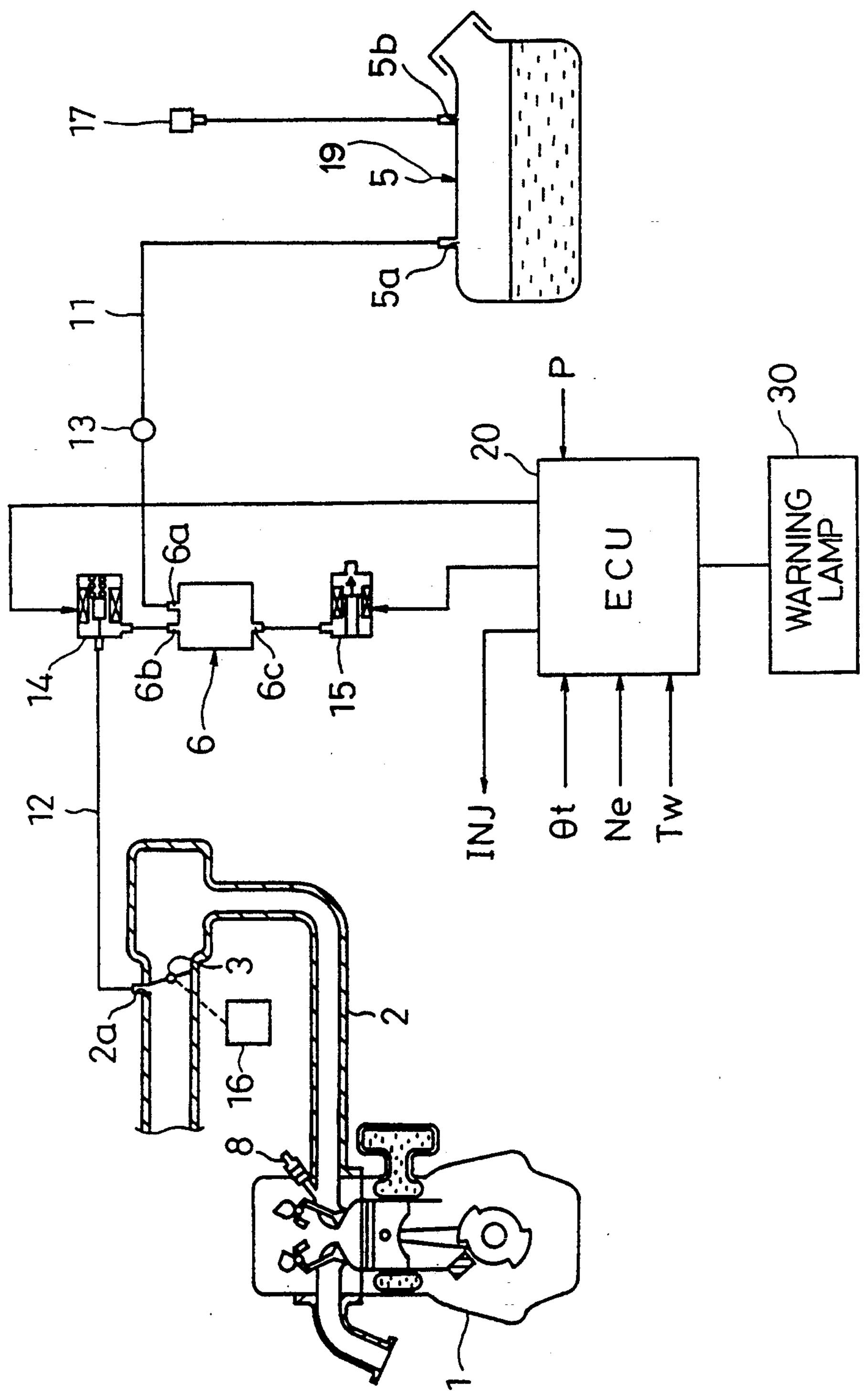
FIG. 1 is a schematic view of a fuel evaporative emission treatment system to which the fault detecting method in accordance with a first embodiment of the present invention is applied.

As shown in FIG. 1, the fuel evaporative emission treatment system in which the method of this embodiment is used is provided with a canister 6 containing an adsorbent such as activated charcoal for adsorbing fuel evaporative emission. The canister 6 has an inlet port **6*a* for admitting fuel evaporative emission in a fuel tank 5, an outlet port 6*b* for discharging fuel evaporative emission to a suction pipe 2 of an engine 1, and a vent port 6*c*** for admitting the atmospheric air.

The inlet port 6a is connected to a port **5*a* disposed on the top surface of the fuel tank 5 via a passage means, for example, a pipe 11, and a check valve 13 is installed halfway in the pipe 11. The outlet port 6*b* is connected to a purge port 2*a* disposed on the wall of the suction pipe 2 of the engine 1 via a pipe 12 which is a passage means. The purge port 2*a* is disposed, for example, at a position such that the purge port 2*a* is located on the downstream side of a throttle valve 3 when the throttle valve is opened from the fully closed condition to a predetermined degree of opening or further. Halfway in the pipe 12, a purge solenoid valve 14 of, e.g., a normally closed type is installed. The vent port 6*c* is connected, via a pipe 19, to one port of a vent solenoid valve 15 of, e.g., a normally open type, and the other port of the solenoid valve 15 is open to the atmosphere. The solenoid valves 14 and 15, being connected to the output side of an electronic control unit (ECU) 20, are operated under the control of the ECU 20**.

In the fuel evaporative emission treatment system constructed as described above, during the time when the operation of engine 1 is stopped, the normally closed type purge solenoid valve 14 and the normally open vent solenoid valve 15 are deenergized; the purge solenoid valve 14 closes, while the vent solenoid valve 15 opens. When the internal pressure of the fuel tank 5 exceeds the valve opening pressure of the check valve 13, the fuel evaporative emission in the fuel tank 5 flows into the canister 6 via the pipe 11 and the inlet port **6*a*, and is adsorbed by the activated charcoal in the canister 6**.

Subsequently, during the time when the engine is operated, the degree of opening of the throttle valve 3 increases, by which the purge port **2*a* is located on the downstream side of the throttle valve 3. Then, a negative pressure of suction air generated in the suction pipe 2 is admitted into the pipe 12 via the purge port 2*a*. Afterward, when the engine 1 preferably becomes in an operating condition in which excessive fluctuation in engine torque does not occur even when-fuel evaporative emission is sucked in the suction pipe 2, the purge solenoid valve 14 is energized to open, by which a negative pressure of suction air acts on the canister 6 via the pipe 12 and the outlet port 6*b*. As a result, the internal pressure of the canister 6 becomes lower than the atmospheric pressure, so that the atmospheric air (purge air) flows into the canister 6 via the solenoid valve 15 in the open condition, the pipe 19, and the vent port 6*c*. Thus, the fuel evaporative emission which has been adsorbed by the activated charcoal is separated from the activated charcoal by the purge air. The separated fuel evaporative emission is sucked into the suction pipe 2 together with the purge air via the outlet port 6*b*, the pipe 12, and the purge port 2*a*, and burns in a cylinder of the engine 1**.

For the purpose of the fault detecting process described later, the fuel evaporative emission treatment system further comprises a throttle sensor 16 for detecting the degree of opening $\theta$ t of the throttle valve 3, a pressure sensor 17 which 1s connected to a port **5*b* disposed on the top surface of the fuel tank 5** to detect the internal pressure P of the tank, the ECU 20 for carrying out the fault detecting process, and a warning means such as a warning lamp 30 for telling of any fault in the system. The sensors 16 and 17 are connected to the input side of the ECU 20, and the warning lamp 30 is connected to the output side of the ECU 20. The warning lamp 30 is installed on, for example, an instrument panel (not shown) so that the driver can easily see it.

The ECU 20 includes a processor, memory, an interface circuit, a timer and so on to perform not only the fault detecting function but various normal control functions, such as fuel injection quantity control function, which are not associated with the present invention. For the purpose of fuel injection quantity control, an engine rpm sensor, a water temperature sensor, an air flow sensor, etc. (not shown) are connected in addition to the throttle sensor 16 on the input side of the ECU 20 to detect engine rpm Ne, engine water temperature $T_w$, amount of suction air and so on. On the output side, injectors (INJ) (one of which is indicated by reference numeral 8 in FIG. 1) installed in the respective cylinders of the engine 1 are connected. The ECU 20 determines the engine operating condition on the basis of the detection signals inputted from these sensors, computes the fuel injection quantity suitable for the engine operating condition, and drives injectors for the valve opening time corresponding to the fuel injection quantity.

The fault detecting process of a fuel evaporative emission treatment system carried out by the ECU 20 will be described below with reference to FIGS. 2 through 4.

The substantial part of this fault detecting process is carried out, for example, one time for the period from the start to the stop of the engine 1. Specifically, it is carried out when the engine 1 is first operated in a particular operating condition in which the suction air quantity increases to a considerable degree, for example, in the air-fuel ratio feedback range, after the engine is started.

The fault detecting process is started, for example, when the ignition key is turned on for engine start. When the engine is started, the processor (not shown) of the ECU 20 resets the, check finished flag $F_{FIN}$ to "0" representing unfinished fault detection (Step S1). Then, the processor judges whether the flag $F_{FIN}$ is set to "1" representing finished fault detection (Step S2). Immediately after engine is started, the flag $F_{FIN}$ is kept being reset to the initial value "0"; therefore, the judgment result at Step 2 is NO. In this case, the processor further judges whether the check flag $F_{CHK}$ is set to "1" representing the satisfaction of start conditions for detection of the change in internal pressure of fuel tank (completion of exhaust or evacuation of fuel tank for the detection of the change in internal pressure) (Step S3). Since the check flag $F_{CHK}$ is kept being reset to "0" at Step S14 for fault detection (described later) executed during previous engine operation, the Judgment result at Step 3 becomes NO.

Then, the processor Judges whether the fault detection start conditions are satisfied (Step S4). In this embodiment, the fault detection (exhaust of fuel tank 5) is started only when the engine 1 is operated in a particular operating condition in which a predetermined quantity or more of suction air is supplied to the engine 1, to thereby prevent excessive fluctuation in air-fuel ratio of mixture which would be caused by the fuel evaporative emission sucked in the suction pipe 2 of the engine 1 together with the mixture during the execution of fault detection. Therefore, the processor judges whether the current engine operating condition is suitable for fault detection start on the basis of the output Vt of the throttle sensor 16, which represents the degree of opening $\theta$ t of throttle.

If the judgment result at Step S4 is that the throttle sensor output Vt is equal to or less than a predetermined value Vs, the processor judges that the degree of opening $\theta$ t of throttle is less than a predetermined degree of opening and that the engine 1 is not in the particular operating condition. The processor resets the initial flag $F_{INIT}$ to "0" representing the dissatisfaction of fault detection start conditions (Step S5). Thus, the normally closed type purge solenoid valve 14 and the normally open type vent solenoid valve 15 are deenergized sequentially (Steps S6 and S7). As a result, the pipe 12 is closed by the purge solenoid valve 14 in the closed condition, by which the exhaust of the fuel tank 5 for fault detection (introduction of a negative pressure of suction air) is inhibited. The vent port 6c of the canister 6 is connected to or communicated with the atmosphere via the vent solenoid valve 15 in the open condition.

Figure 2:
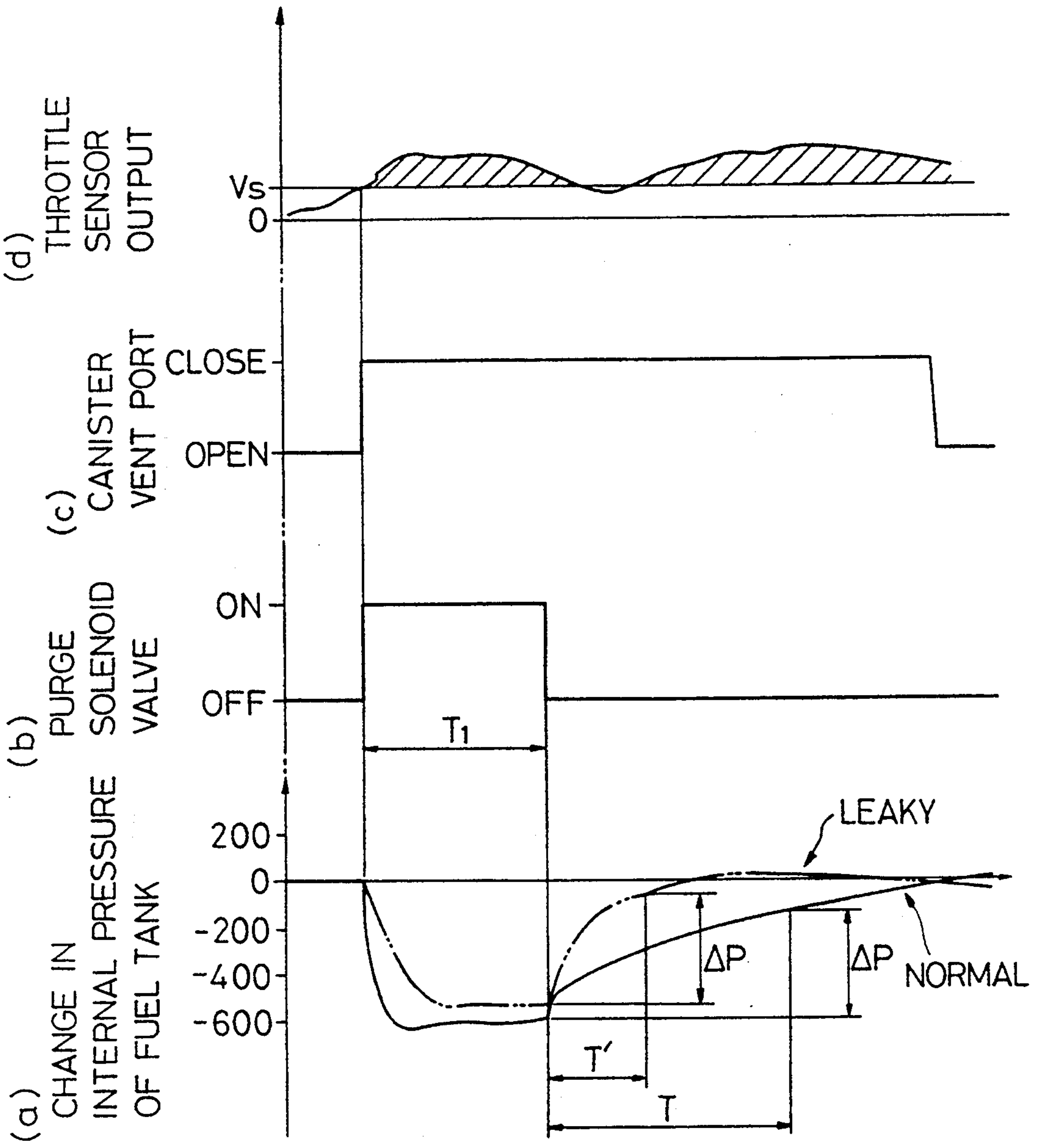
FIG. 2 is a graph showing the change in throttle sensor output, the change in operating condition of canister vent port and purge solenoid valve, and the change in internal pressure of fuel tank, with respect to elapsed time, just before and during the execution of fault detecting process in accordance with the first embodiment.

Afterward, during the time when the above-described steps S2 through S7 are repeated, when it is judged at Step S4 that the output Vt of the throttle sensor becomes higher than the predetermined value Vs (see FIG. 2(*a*)), the processor judges that the engine 1 is operated in a particular operating condition suitable for fault detection, and therefore the fault detection start conditions are satisfied.

In this case, the processor judges whether the value of the initial flag $F_{INIT}$ is "1" representing the satisfaction of fault detection start conditions (Step S8). Since the initial flag $F_{INIT}$ is kept being reset to "0" at Step S5 in the previous execution cycle of Steps S2 through S7, the judgment result at Step S8 becomes NO. Therefore, after the initial flag $F_{INIT}$ is set to "1" (Step S9), the processor sequentially energizes the purge solenoid valve 14 and the vent solenoid valve 15 as shown in FIG. 2(*b*) and (*c*) (Steps S10 and S11), and then restarts a first timer (Step S12).

As a result, the outlet port 6*b* of the canister 6 is connected to the suction pipe 2 via the purge solenoid valve 14 in the open condition, the pipe 12, and the purge port 2*a*, and the vent port 6*c* of the canister 6 is closed by the vent solenoid valve 15 in the closed condition. At this time, the purge port 2*a* is located on the downstream side of the throttle valve 3. Therefore, a negative pressure of suction air acts on the outlet port 6*b* of the canister 6. Consequently, the pressure on the side of canister 6 becomes lower than the internal pressure of fuel tank, so that the check valve 13 becomes in the open condition, thereby the inlet port 6*a* of the canister 6 being connected to the internal space of fuel tank 5 via the pipe 11. Thus, the fuel tank 5 is connected to the suction pipe 2. Therefore, the gas containing fuel evaporative emission and air in the fuel tank 5 is sucked into the suction pipe 2 by the negative pressure of suction air, by which the exhaust of the fuel tank 5 or exhaust of the gas in the fuel tank is started. The first timer measures or counts the elapsed time (exhaust time) from the fault detection start point.

After Step S12 is executed, this program returns to Step S2. Since the check finished flag $F_{FIN}$ and the check flag $F_{CHK}$ are kept "0" representing the unfinished fault detection and the dissatisfaction of start conditions for detection of the change in internal pressure of the tank, both the judgment results at Steps S2 and S3 become NO. Therefore, the processor again judges whether the output Vt of the throttle sensor is higher than the predetermined value Vs (Step S4). If the judgment result is NO, the above-described Steps S5 through S7 are executed to interrupt the exhaust of fuel tank which has been once started. If the judgment result at Step S4 is YES, the processor judges whether the initial flag $F_{INIT}$ is set to "1" (Step S8). Since the initial flag $F_{INIT}$ is kept being set to "1" at Step S9 executed just before the start of the exhaust of the fuel tank 5, the judgment result at Step S8 becomes YES. Then, the processor judges whether the exhaust time is longer than a predetermined time $T_1$ by referring to the output of the first timer representing the elapsed time (exhaust time) from the fault detection start point (Step S13).

Immediately after the fault detection start conditions are satisfied, the exhaust time is shorter than the predetermined time $T_1$; therefore, the judgment result at Step S13 becomes NO. In this case, the program returns to Step S2. Afterward, as long as the engine 1 is operated in the particular operating condition, Steps S2 through S4, S8, and S13 are repeatedly executed. As a result, the exhaust of the fuel tank 5 due to a negative pressure of suction air is continued. For this reason, the internal pressure of the fuel tank 5 decreases rapidly as indicated by the solid line in FIG. 2(*a*) if the fuel evaporative emission treatment system is normal. If the system has a fault such as poor airtightness, the internal pressure of the tank decreases somewhat slowly as indicated by the two-dot chain line in FIG. 2(*a*). Although the fuel evaporative emission in the fuel tank 5 is sucked into the suction pipe 2 during the exhaust of the fuel tank 5, the output torque of the engine is not fluctuated excessively because the engine 1 is operated in the particular operating condition.

At Step S13 in the execution cycle of Steps S2 through S4, S8, and S13, if it is judged that the exhaust time counted by the first timer is longer than the predetermined time $T_1$, the processor judges that the exhaust of the fuel tank 5 or reduction of the internal pressure of the fuel tank is sufficiently carried out, resets the initial flag $F_{INIT}$ to "0" representing the completion of exhaust (Step S14), and sets the check flag $F_{CHK}$ to "1" representing the satisfaction of start conditions for detection of the change in internal pressure (Step S15).

Next, the processor of the ECU 20 reads the output signal from the pressure sensor 17 representing the internal pressure of the fuel tank, and stores the pressure data representing the internal pressure of the fuel tank at the time when the exhaust is completed, i.e., at the time when the detection of fluctuation or change in the internal pressure of the tank to, for example, the built-in memory in the ECU 20 (Step S16). Further, the processor deenergizes the purge solenoid valve 14 (Step St7). Thus, the outlet port 6*b* of the canister 6 is closed by the purge solenoid valve 14 in the closed condition, and the initial condition of detection of the change in the internal pressure of the tank is established. Next, the processor restarts a second timer for counting or measuring the elapsed time from the point of time when the exhaust of the fuel tank 5 is completed (Step S18). Then, the program returns to Step S2.

Since the check finished flag $F_{FIN}$ is kept "0" representing unfinished fault detection, the judgment at Step S2 becomes NO. Also, since the check flag $F_{CHK}$ has been set to "1" at Step S15 executed immediately after the exhaust of the fuel tank 5 is completed, the judgment result at Step S3 becomes YES. Then, the processor reads the output of pressure sensor which represents the current internal pressure of the tank to start the determination of the change in internal pressure in the tank (Step S19). Next, the processor reads the pressure data, from memory, which has been stored in memory at Step S16 executed immediately after the exhaust is completed and represents the internal pressure of the tank at the time when the exhaust is completed. Based on the pressure sensor output and the pressure data, the processor computes the pressure rise a ΔP generated in the fuel tank 5 in the period from the time when the exhaust has been completed to the present time, and judges whether the pressure rise a ΔP exceeds a predetermined value Ps (Step S20).

As described above, when the outlet port 6*b* of the canister is closed after the fuel tank 5 is exhausted or evacuated for the predetermined time $T_1$ with the vent port 6*c* being closed, a negative pressure is stored in the canister 6 and the fuel tank 5. As shown in FIG. 2(*a*), if the fuel evaporative emission treatment system is normal, this negative pressure is approximately equal to the negative pressure of suction air produced in the suction pipe 2, while if the system has a fault such as poor airtightness, the absolute value of the negative pressure is lower than the absolute value of the negative pressure of suction air.

If a negative pressure is present in the fuel tank 5, the fuel (gasoline) in the fuel tank 5 evaporates, by which the internal pressure of the fuel tank increases gradually. Therefore, if the fuel evaporative emission treatment system consisting of the fuel tank 5, the pipe 11, the canister 6 and the like is normal, the internal pressure of the fuel tank increases gradually as indicated by the solid line in FIG. 2(*a*). If the treatment system has any fault, for example, if there is a small hole anywhere in the fuel tank 5 or the pipe 11, atmospheric air flows into the treatment system through the small hole; therefore, the rising rate of internal pressure of the tank increases as compared with the case where the system is normal, as indicated by the two-dot chain line.

During the time when the internal pressure of the tank increases, if the processor judges, at Step S20, that the pressure rise ΔP in the period from the time when the exhaust has been completed to the present time is lower than the predetermined pressure Ps, it measures the internal pressure of the tank again at Step S19 and makes judgment of Step S20 again.

Afterward, if the processor judges, at Step S20, that the pressure rise ΔP is equal to or higher than the predetermined value Ps, it judges whether the time elapsing from the time when the exhaust is completed, which is counted by the second timer, is shorter than a predetermined time $T_2$ (Step S21).

Afterward, when the fuel evaporative emission treatment system consisting of the fuel tank 5, the purge passage 11, the canister 6 and the like is normal and therefore the internal pressure of the fuel tank increases gradually, the time T taken for the change amount ΔP of internal pressure to reach the predetermined value Ps increases (see FIG. 2(*d*)). When the treatment system has any fault, and therefore the rising rate of tank pressure is high, the time T' taken for the predetermined pressure rise Ps is shorter than the time T in the case where the system is normal (see FIG. 2(*d*)). The predetermined time $T_2$ is preset in such a manner so as to be shorter than the time T required in the case when the system is normal and longer than the time T′ required in the case when the system is abnormal.

If the judgment result at Step S21 is NO, the processor judges that the fuel evaporative emission treatment system is normal, and deenergizes the warning lamp 30 (Step S22). Thereby, the warning lamp 30 goes off to show that the system is normal. If the judgment result at Step S21 is YES, the processor judges that the fuel evaporative emission treatment system is abnormal, and energizes the warning lamp 30 (Step S23). Thereby, the warning lamp 30 goes on to warn the driver that the system,is abnormal to prompt him/her to make early repair. This warning informs the driver of the occurrence of a fault in the fuel evaporative emission treatment system, so that the driver can take action quickly.

After the warning lamp 30 is deenergized or energized at Step S22 or Step S23, the processor resets the check flag $F_{CHK}$ to "0" representing the completed detection of internal pressure of tank (Step S24), deenergizes the normally open type vent solenoid valve 15 (Step S25), and sets the check finished flag $F_{FIN}$ to "1" representing finished fault detection (Step S26). Then, the program returns to Step S2, where judgment is made whether the check finished flag $F_{FIN}$ is set to "1". Since the result of this judgment is YES, the fault detecting process is completed.

As described above, in this embodiment, the change $\Delta P$ in internal pressure of the tank (the difference between the internal pressure of the fuel tank at the time when the detection of change in internal pressure is started and the internal pressure of the fuel tank at the time when the detection of change in internal pressure is completed) is used as a fault detection parameter. This eliminates errors in detecting faults caused by the variation in the exhaust completion condition, i.e., the internal pressure of the tank at the exhaust completion time (FIG. 2(*a*)) occurring in accordance with the presence/absence of poor airtightness of the fuel tank or the like. Also, the effect of the engine operating condition on the internal pressure of tank at the detection start time and the effect of the engine operating condition on the internal pressure of tank at the detection completion time are compensated with each other, thereby the effect of engine operating condition on the fault detection parameter being reduced. Therefore, the criterion for detecting system faults (predetermined time $T_2$) can be set to a value such that a minor system fault can be detected, by which the presence of a system fault can be detected more precisely.

Faults such as poor airtightness (leak) of the fuel evaporative emission system need not be detected at all times. In this embodiment, the fault detecting process is restarted when the engine 1 is first operated in a particular operating condition after the next engine start.

Next, a method of detecting faults in accordance with the second embodiment of the present invention will be described below.

As compared with the above-described first embodiment in which faults are detected on the basis of the elapsed time from the point of time when the exhaust of the fuel tank 5 is completed to the point of time when a predetermined pressure rise Ps is generated in the tank, the second embodiment has a feature such that faults are detected on the basis of the change in internal pressure of the tank produced just before a predetermined time (set time) elapses from the point of time when the exhaust of fuel tank is completed.

The method of this embodiment can be applied to the fuel evaporative emission treatment system which is the same as that shown in FIG. 1. With the method of this embodiment, the same fault detecting process as shown in FIGS. 3 and 4 is carried out except for the fault detection procedure (Steps S20′ and S21′ in FIG. 5) relating to the above feature.

Next, the main portion of the method of this embodiment will be described with reference to FIG. 4 and FIG. 5 (corresponding to FIG. 3).

In the fault detecting process, the processor in the ECU 20 resets the check finished flag $F_{FIN}$ to "0" (Step S1 in FIG. 5), and then judges whether the flag $F_{FIN}$ is set to "1" (Step S2). Since this judgment result is NO just after the engine is started, the processor executes the steps shown in FIG. 4 as with the case of first embodiment. Giving a brief description, when a particular operating condition of the engine 1 is reached after the engine is started, the exhaust of the fuel tank 5 is started. Afterward, when a predetermined time $T_1$ elapses from the point of time when the exhaust is started (Step S13 in FIG. 4), the initial flag $F_{INIT}$ is reset to "0" representing the completion of exhaust, and the check flag $F_{CHK}$ is set to "1" representing the satisfaction of start conditions for detection of the change in internal pressure (Steps S14 and S1S in FIG. 4). Then, the internal pressure of the fuel tank is measured at the time when the exhaust is completed, the purge solenoid valve 14 is closed, and the second timer is restarted (Steps S16 through S18).

Figure 5:
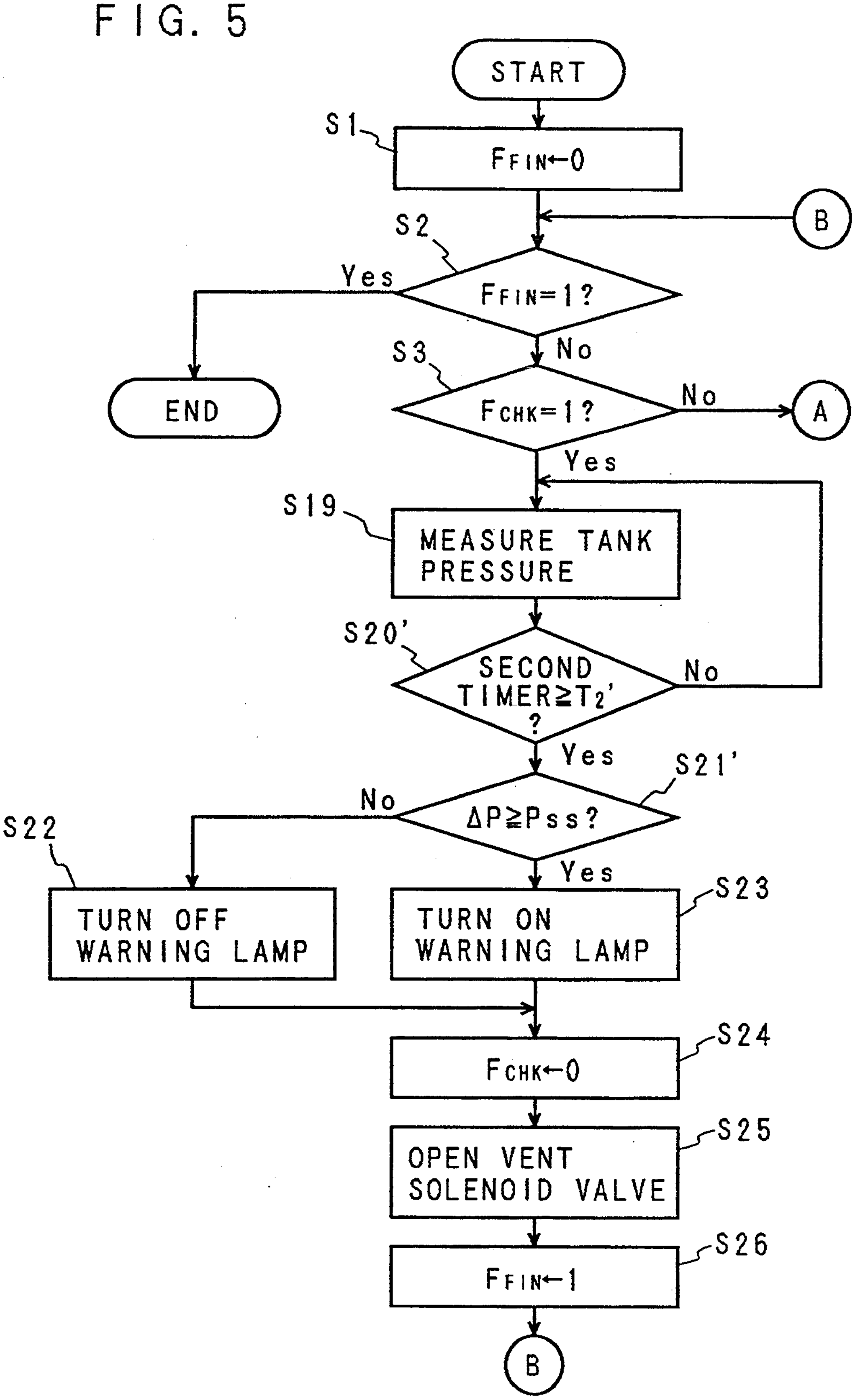
FIG. 5 is a flowchart showing the main part of the fault detecting process carried out in the fault detecting method in accordance with a second embodiment of the present invention.

At Step S19 following Steps S2 and S3 in FIG. 5, the processor measures the internal pressure of the fuel tank at the time when the detection of the change in internal pressure of the tank is started, and stores it. Then, the processor judges whether the elapsed time from the point of time when the exhaust is completed, which is counted by the second timer, is equal to or longer than a predetermined time (set time) $T_2'$ (Step S20′). This predetermined time $T_2'$ is set to a value equal to or different from the predetermined time $T_2$ associated with Step S21 in FIG. 3 in connection with the first embodiment. For the reason mentioned in the description of operation in the first embodiment, the internal pressure of the fuel tank at the point of time when the predetermined time $T_2'$ elapses from the point of time when the exhaust is completed is higher than the internal pressure at the point of time when the exhaust is completed. The magnitude of this pressure rise $\Delta P$ varies depending on whether the fuel evaporative emission treatment system is normal or abnormal or on the degree of the abnormality of the system.

Figure 4:
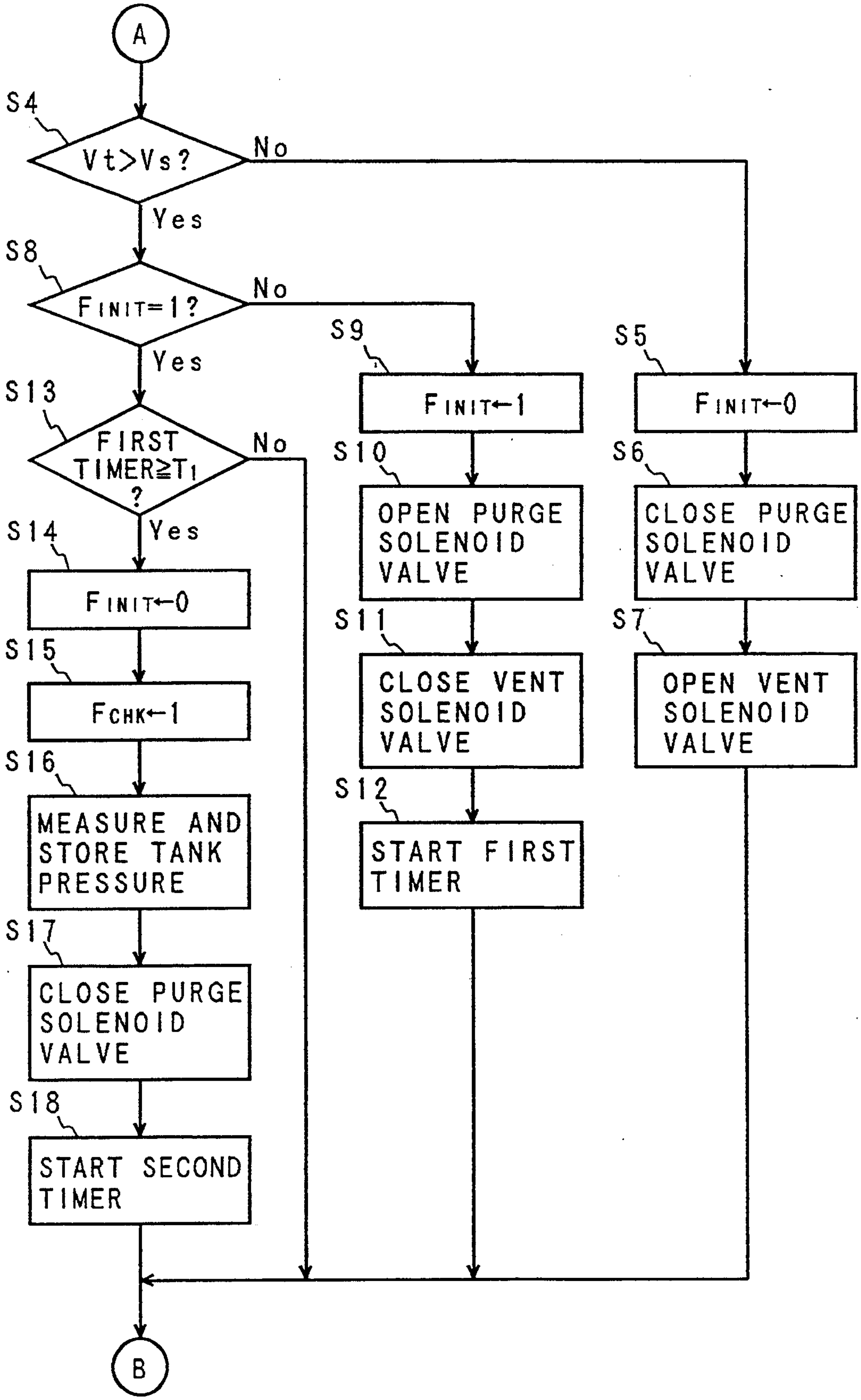
FIG. 4 is a flowchart showing the remaining part of the fault detecting process in accordance with the first embodiment.

If the processor judges, at Step S20′, that the predetermined time $T_2'$ has elapsed from the point of time when the exhaust is completed, it judges whether the pressure rise $\Delta P$, generated in the fuel tank 5 by the point of time when the predetermined time $T_2'$ elapses from the point of time when the exhaust is completed is equal to or greater than a predetermined value Pss, on the basis of the internal pressure of the tank measured at Step 19 just before this judgment and the internal pressure of the tank measured at Step S16 in FIG. 4 when the exhaust is completed (Step S21′).

If the judgment result is NO, 1.e., if the pressure rise $\Delta P$ is less than the predetermined value Pss, the processor judges that the treatment system is normal and turns off the warning lamp 30 (Step S22). If the pressure rise $\Delta P$ is equal to or greater than the predetermined value Pss, the processor judges that the treatment system has a fault and turns on the warning lamp 30 (Step S23). Afterward, the process similar to that of the first embodiment is carried out (Steps S24 through S26 and S2), thus the fault detecting process being completed.

Next, a method of detecting faults in accordance with the third embodiment of the present invention will be described.

As compared with the above-described first embodiment in which the exhaust of the fuel tank 5 is performed for the predetermined time $T_1$, the third embodiment has a feature such that the exhaust is completed when the internal pressure of the tank decreases to a predetermined pressure as the fuel tank is exhausted or evacuated.

The method of this embodiment can be applied to the fuel evaporative treatment system which is the same as that shown in FIG. 1. With the method of this embodiment, the same fault detecting process as shown in FIGS. 3 and 4 is carried out except for the exhaust completion procedure (Steps S13' through S16' in FIG. 6) relating to the above feature.

Next, the main portion of the method of this embodiment will be described with reference to FIG. 3 and FIG. 6 (corresponding to FIG. 4).

Figure 6:
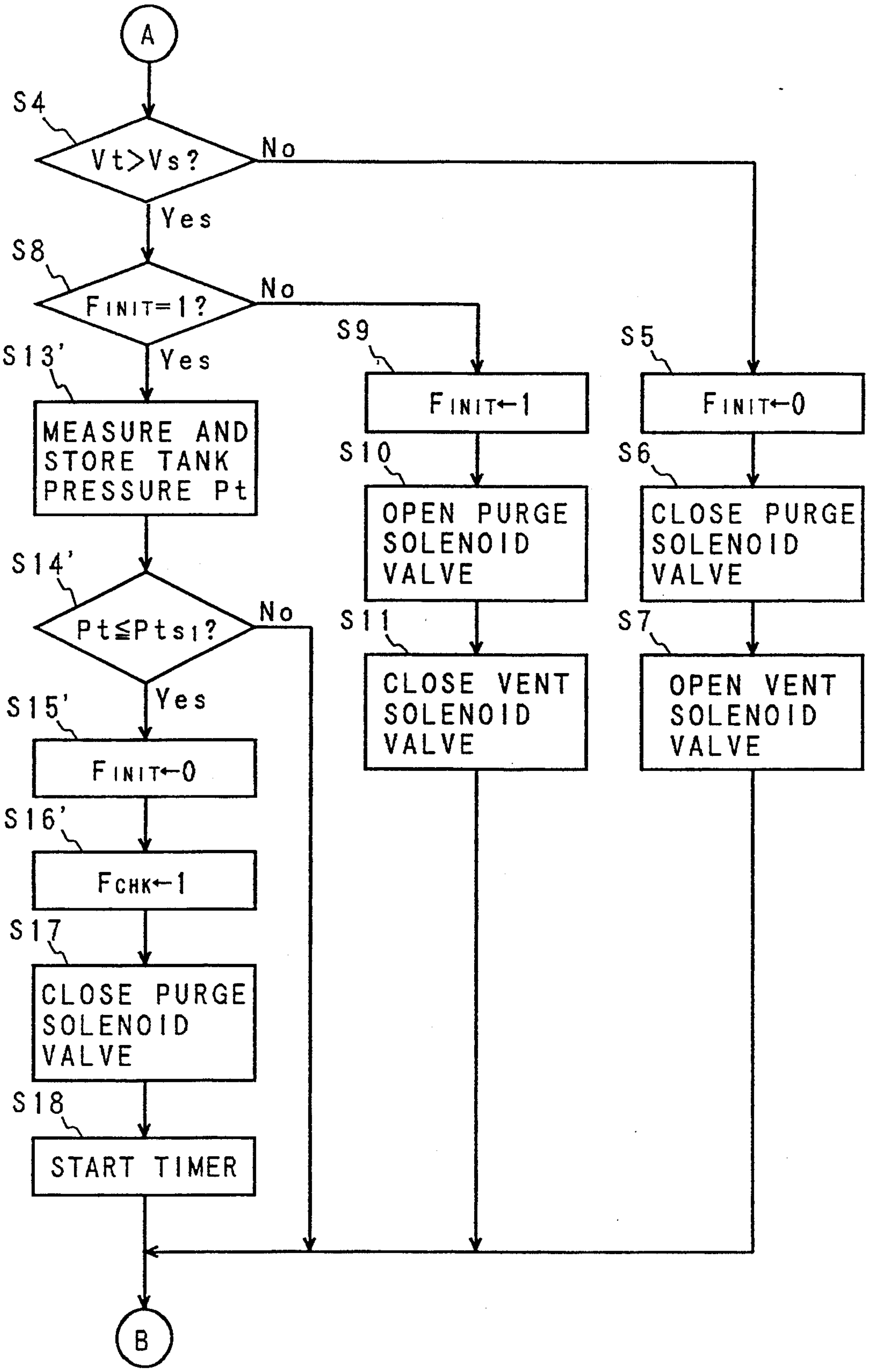
FIG. 6 is a flowchart showing the main part of the fault detecting process carried out in the fault detecting method in accordance with a third embodiment of the present invention.

In the fault detecting process, after the check finished flag $F_{FIN}$ is reset to "0" (Step S1 in FIG. 3), if the processor in the ECU 20 judges that neither the check finished flag $F_{FIN}$ nor the check flag $F_{CHK}$ is set to "1" at Steps S2 and S3, the processor judges whether the throttle sensor output Vt exceeds a predetermined value Vs (Step S4 in FIG. 6).

If the judgment result is NO, i.e., if it is judged that the engine 1 is not operated in the particular operating condition, the processor resets the initial flag $F_{INIT}$ to "0" to inhibit the exhaust of the fuel tank 5 for fault detection as with the case of the above-described first embodiment (Step S5), and deenergizes the normally closed type purge solenoid valve 14 and the normally open type vent solenoid valve 15 sequentially (Steps S6 and S7).

Afterward, if the processor judges that the throttle sensor output Vt becomes higher than the predetermined value Vs at Step S4, the processor sets the initial flag $f_{INIT}$ to "1" representing the satisfaction of fault detection start conditions (Step S9) as with the case of the above-described first embodiment, and then energizes the purge solenoid valve 14 and the vent solenoid valve 15 sequentially to start the exhaust of the fuel tank 5 (Steps S10 and S11). The fault detecting process of this embodiment, which has an exhaust completion procedure different from that of the first embodiment, does not include Step S12 in FIG. 4 which restarts the first timer.

Figure 3:
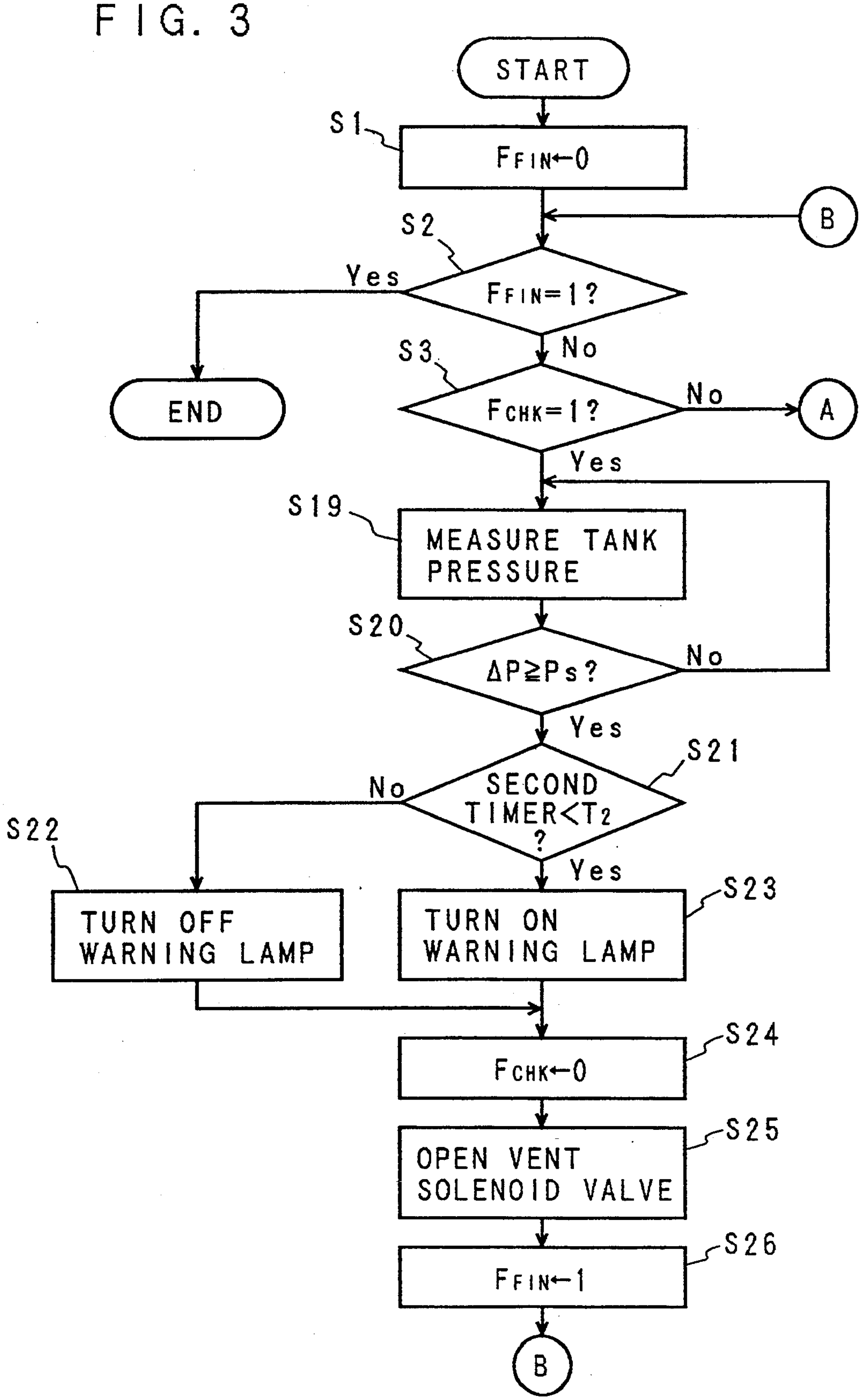
FIG. 3 is a flowchart showing a part of the fault detecting process in accordance with the first embodiment.

After the exhaust of the fuel tank 5 is started, at Step S4 in FIG. 6 which is executed following Steps S2 and S3 in FIG. 3, the processor judges whether the throttle sensor output Vt is higher than the predetermined value Vs. If this judgment result is NO, the above-mentioned Steps S5 through S7 are executed to discontinue the fault detection (exhaust of fuel tank 5) which was started once. If the judgment result at Step S4 is YES, the processor judges, at Step S8, that the initial flag $F_{INIT}$ is set to "1", and then reads the current pressure sensor output representing the internal pressure Pt of the fuel tank and stores it, for example, in the memory in the ECU 20 (Step S13').

Then, the processor reads, from the memory, a predetermined pressure $Pts_1$, which has been preset a value lower than the atmospheric pressure and stored in the memory, and judges whether the current internal pressure Pt of the fuel tank read at Step 13' is equal to or lower than the predetermined pressure $Pts_1$ (Step S14'). Immediately after the fault detection start conditions are satisfied (the exhaust is started), the internal pressure Pt of the fuel tank is higher than the predetermined pressure $Pts_1$; therefore, the judgment result at Step S14' is NO. In this case, the program returns to Step S2 in FIG. 3. Afterward, as long as the engine 1 is operated in the particular operating condition, Steps S2 and S3 in FIG. 3 and Steps S4, S8, S13', and S14' in FIG. 6 are repeatedly executed. As a result, the exhaust of the fuel tank 5 due to the negative pressure of suction air continues.

At Step S14' in the subsequent execution cycle of Steps S2 through S4, S8, S13', and S14', if the processor judges that the current internal pressure Pt of the fuel tank is equal to or less than the predetermined pressure $Pts_1$, it judges that the exhaust of the fuel tank 5 has sufficiently been performed, so that the processor resets the initial flag $F_{INIT}$ to "0" representing the completion of exhaust (Step S15'), and sets the check flag $F_{CHK}$ to "1" representing the satisfaction of start conditions for detection of the change in internal pressure (Step S16'). Then, the processor deenergizes the purge solenoid valve 14 (Step S17), and restarts a timer (corresponding to the second timer in the first embodiment) for counting the elapsed time from the point of time when the exhaust of the fuel tank 5 is completed (Step S18). Thus, the program returns to Step S2.

After the processor judges that the check finished flag $F_{FIN}$ is not set to "1" and the check flag $F_{CHK}$ is set to "1" at Steps S2 and S3, it reads the pressure sensor output representing the internal pressure of the tank as with the case of the first embodiment (Step S19 in FIG. 3), and judges whether the pressure rise $\Delta P$ generated in the fuel tank 5 in the period from the time when the exhaust is completed to the present time is equal to or higher than the predetermined value Ps (Step S20). During the time when the internal pressure of the tank increases, the processor repeatedly executes Steps S19 and S20.

Afterward, if the processor judges, at Step S20, that the pressure rise $\Delta P$ is equal to or greater than the predetermined value Ps, it judges whether the time elapsing from the time when the exhaust is completed, which is counted by the timer (corresponding to the second timer in the first embodiment), is shorter than the predetermined time $T_2$ (Step S21). If the judgment result at Step S21 is NO, the processor judges that the fuel evaporative emission treatment system is normal, and deenergizes the warning lamp 30 (Step S22). If the judgment result at Step S21 is YES, the processor judges that the treatment system is abnormal, and energizes the warning lamp 30 (Step S23). The processor sequentially executes Steps S24 through S26 and S2 as with the case of the first embodiment, by which the fault detecting process is completed.

The method of detecting faults in accordance with the present invention is not limited to the above-described first through third embodiments, but can be modified variously.

For example, in the above third embodiment, it was judged at Step S20 in FIG. 3 whether the pressure rise (change in pressure) $\Delta P$ generated in the fuel tank 5 in the period from the time when the exhaust was completed to the time of detection was equal to or greater than the predetermined value Ps in order to detect the change in internal pressure of the tank when the exhaust of the fuel tank 5 was completed. In other words, in the third embodiment, the change in internal pressure of the tank was detected in terms of relative pressure. According to the third embodiment, however, since the internal pressure of the tank at the time when the detection of the change in internal pressure of the tank is started is constant, the change in internal pressure of the tank may be detected in terms of absolute pressure in place of relative pressure.

Figure 7:
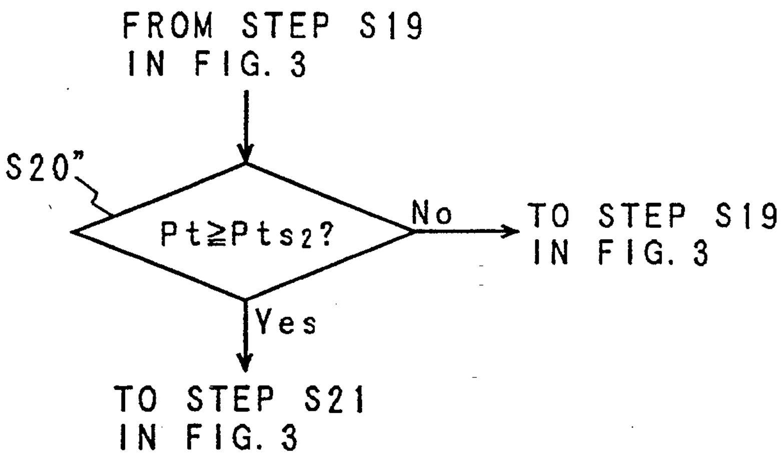
FIG. 7 is a part of flowchart for fault detecting process in accordance with a modification of the third embodiment.

In this case, as shown in FIG. 7, the processor judges whether the tank pressure Pt measured at Step S19 in FIG. 3 is equal to or greater than a predetermined pressure $Pts_2$ at Step 20″ in FIG. 7. The predetermined pressure $Pts_2$ is set so as to be lower than the atmospheric pressure and higher than the predetermined pressure $Pts_1$ for judging the completion of exhaust (the internal pressure of the tank at the time when the detection of the change in internal pressure is started) which was explained in connection with Step S14′ in FIG. 6.

Also, the fault detecting process corresponding to the combination of the procedure shown in FIG. 5 and the procedure shown in FIG. 6 may be performed by modifying the second embodiment or the third embodiment. In this case, as with the case of the third embodiment, the procedure shown in FIG. 6 (particularly Steps S13′ and S14′) is followed, so that the exhaust is completed when the internal pressure Pt of the tank decreases to the predetermined pressure $Pts_1$ as the fuel tank is exhausted. Further, as with the case of the second embodiment, the procedure shown in FIG. 5 (particularly, Steps S20′, S21′, S22, and S23) is followed. If the change $\Delta P$ in internal pressure of the tank generated by the point of time when a predetermined time $T_2'$ elapses from the time when the exhaust of the fuel tank is completed is less than a predetermined value Pss, the fuel evaporative emission treatment system is judged to be normal, while if the change $\Delta P$ in internal pressure is equal to or greater than the predetermined value Pss, the system is judged to be abnormal.

Figure 8:
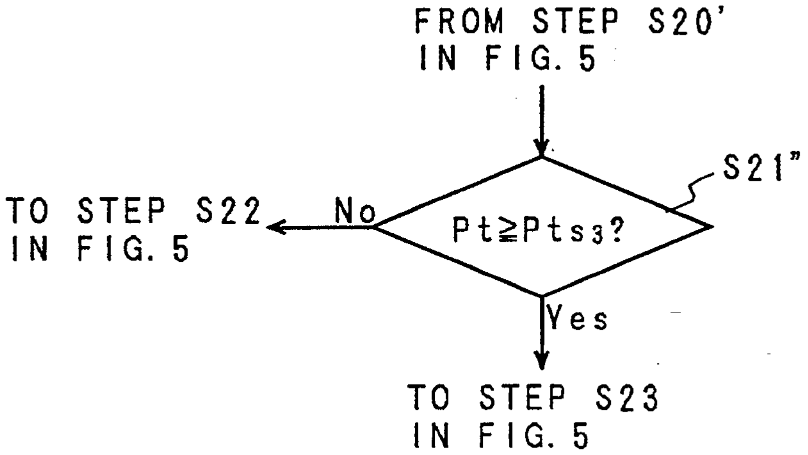
FIG. 8 is a part of flowchart for fault detecting process in accordance with another modification of the second or third embodiment.

Further, the above second modification associated with the second or third embodiment can be further modified by applying the first modification associated with the third embodiment to the second modification. In the second modification, the change in internal pressure of the tank was detected in terms of relative pressure though the internal pressure of the tank was constant when the detection of the change in internal pressure was started. In place of relative pressure, absolute pressure may be used to detect the change in internal pressure of the tank. In this case, as shown in FIG. 8, it is judged whether the tank pressure Pt measured at Step S19 in FIG. 5 is equal to or greater than a predetermined pressure $Pts_3$ at Step S21″ in FIG. 8. The predetermined pressure $Pts_3$ is set so as to be lower than the atmospheric pressure and higher than the predetermined pressure $Pts_1$ for judging the completion of exhaust (the internal pressure of the tank at the time when the detection of the change in internal pressure is started) which was explained in connection with Step S14′ in FIG. 6.

In the above embodiments, the pressure sensor 17 for detecting the Internal pressure of the fuel tank was installed so as to communicate with the fuel tank 5, but the pressure sensor may be connected, for example, to the pipe 11. In this way, the above embodiments can be modified in various manners so long as the pressure data representing the internal pressure of the fuel tank can be detected.

Also, judgment may be made, for example, at a not illustrated step following Step S16 in FIG. 4, to determine whether a negative pressure is produced in the tank after the exhaust of the fuel tank 5 is completed. In this case, if a negative pressure is not produced, it is judged that the pipe 11 or 12 has a fault such as clogging.

Further, a stable negative pressure source (not shown), which is not affected by the engine operating condition, other than the negative pressure of suction air produced in the suction pipe 2 may be used.

What is claimed is:

1. A method of detecting faults for a fuel evaporative emission treatment system in which fuel evaporative emission in a fuel tank is adsorbed by a canister, and the fuel evaporative emission, separated from the canister by admitting atmospheric air into the canister through a vent port of the canister during a subsequent engine operation, is fed to a suction pipe of an engine, comprising the steps of:

reducing an internal pressure of the fuel tank;

detecting a change in internal pressure of the fuel tank after the internal pressure of the fuel tank is reduced; and judging whether the fuel evaporative emission treatment system has a fault on the basis of the detected change in internal pressure of the fuel tank;

wherein said step of reducing the internal pressure of the fuel tank includes the sub-steps of, closing the vent port of the canister;

opening a control valve installed in a first passage means connecting an outlet port of the canister to the suction pipe, so that fuel evaporative emission in the fuel tank is exhausted via the first passage means and a second passage means connecting an inlet port of the canister to the fuel tank; and closing the control valve to complete the exhaust of the fuel evaporative emission when a predetermined time elapses from a point of time when the control valve is opened.

2. A method of detecting faults according to claim 1, wherein said step of detecting the change in internal pressure of the fuel tank includes a sub-step of detecting the internal pressure of the fuel tank at the time when the exhaust of the fuel evaporative emission is completed, and a sub-step of measuring an elapsed time taken for the internal pressure of the fuel tank to increase by a predetermined pressure from the internal pressure of the fuel tank at the time when the exhaust of the fuel evaporative emission is completed; and wherein said step of judging a fault includes a sub-step of judging that the fuel evaporative emission treatment system has a fault if said elapsed time measured is less than a predetermined value.

3. A method of detecting faults according to claim 2, wherein if it is judged that the engine is operated in a particular operating condition, the vent port is closed and the control valve is opened.

4. A method of detecting faults according to claim 3, wherein if a load of the engine is higher than a predetermined level, it is judged that the engine is operated in said particular operating condition.

5. A method of detecting faults according to claim 1, wherein said step of detecting the change in internal pressure of the fuel tank includes a sub-step of detecting the internal pressure of the fuel tank at the time when the exhaust of the fuel evaporative emission is completed, and a sub-step of detecting the internal pressure of the fuel tank at a point of time when a set time elapses from the point of time when the exhaust of the fuel evaporative emission is completed; and wherein said step of judging a fault includes a sub-step of judging that the fuel evaporative emission treatment system has a fault if the internal pressure of the fuel tank which is detected when said set time has elapsed exceeds the internal pressure of the fuel tank which is detected when the exhaust of the fuel evaporative emission is completed by a predetermined value or more.

6. A method of detecting faults according to claim 5, wherein if a load of the engine is higher than a predetermined level, it is judged that the engine is operated in a particular operating condition, and if said particular operating condition is determined, the vent port is closed and the control valve is opened.

7. A method of detecting faults for a fuel evaporative emission treatment system in which fuel evaporative emission in a fuel tank is adsorbed by a canister, and the fuel evaporative emission, separated from the canister by admitting atmospheric air into the canister through a vent port of the canister during a subsequent engine operation, is fed to a suction pipe of an engine, comprising the steps of:

reducing an internal pressure of the fuel tank to obtain a constant internal pressure;

detecting an internal pressure of the fuel tank after the internal pressure of the fuel tank is reduced; and judging whether the fuel evaporative emission treatment system has a fault on the basis of a comparison of the detected internal pressure of the fuel tank with a first predetermined pressure.

8. A method of detecting faults according to claim 7, wherein the step of reducing the internal pressure of the fuel tank includes the sub-steps of, closing the vent port of the canister;

opening a control valve installed in a first passage means connecting an outlet port of the canister to the suction pipe, so that fuel evaporative emission in the fuel tank is exhausted via the first passage means and a second passage means connecting an inlet port of the canister to the fuel tank; and closing the control valve to complete the exhaust of the fuel evaporative emission if the internal pressure of the fuel tank decreases to a second predetermined pressure which is lower than an atmospheric pressure as the fuel evaporative emission is exhausted.

9. A method of detecting faults according to claim 8, wherein the step of reducing the internal pressure of the fuel tank includes the sub-steps of, detecting an engine load, and determining whether a particular engine condition exists based on said detected engine load, and if said engine condition exist performing the sub-steps of closing the vent port and opening the control valve; and the step of judging a fault includes the sub-steps of, measuring an elapsed time from a point of time when the exhaust of the fuel evaporative emission in the fuel tank is completed to a point of time when the internal pressure of the fuel tank reaches said first predetermined pressure which higher than said second predetermined pressure and is lower than the atmospheric pressure, and judging a fault in the fuel evaporative emission treatment system if said elapsed time measured is less than a predetermined value.

10. A method of detecting faults according to claim 8, wherein the step of reducing the internal pressure of the fuel tank includes the sub-steps of, detecting an engine load, and determining whether a particular engine condition exists based on said detected engine load, and if said engine condition exist performing the sub-steps of closing the vent port and opening the control valve;

the step of detecting an internal pressure detects the internal pressure of the fuel tank at the time when a predetermined time elapses from a point of time when the exhaust of the fuel evaporative emission in the fuel tank is completed; and the step of judging a fault judges that the fuel evaporative emission treatment system has a fault if the measured internal pressure of the fuel tank exceeds a predetermined value.

11. A method of detecting faults according to claim 7, wherein the step of judging a fault includes the sub-steps of, measuring an elapsed time from a point of time when the exhaust of the fuel evaporative emission in the fuel tank is completed to a point of time when the internal pressure of the fuel tank reaches said first predetermined pressure which is lower than the atmospheric pressure; and judging a fault in the fuel evaporative emission treatment system if said elapsed time measured is less than a predetermined value.

12. A method of detecting faults according to claim 7, wherein the step of detecting an internal pressure detects the internal pressure of the fuel tank at the time when a predetermined time elapses from a point of time when the exhaust of the fuel evaporative emission in the fuel tank is completed; and the step of judging a fault judges that the fuel evaporative emission treatment system has a fault if the measured internal pressure of the fuel tank exceeds a predetermined value.

13. An apparatus for detecting faults in a fuel evaporative emission treatment system, comprising:

a canister adsorbing fuel evaporative emission in a fuel tank;

a vent port controlling the admission of atmospheric air into the canister, the admitted atmospheric air separating the fuel evaporative emission from the canister;

a control valve controlling the feed of separated fuel evaporative emission from the canister to a suction pipe of an engine;

a pressure sensor for measuring an internal pressure of the fuel tank;

a control unit for controlling the open and close state of the vent port and the control valve based on the measured internal pressure, said control unit (a) causing a reduction in the internal pressure of the fuel tank by (i) closing the vent port of the canister, (ii) opening the control valve so that fuel evaporative emission in the fuel tank is exhausted via the canister, and (iii) closing the control valve to complete the exhaust of the fuel evaporative emission in the fuel tank when a predetermined time elapses from a point of time when the control valve is opened;

(b) determining a change in internal pressure of the fuel tank after the internal pressure of the fuel tank is reduced, and (c) judging whether the fuel evaporative emission treatment system has a fault on the basis of the determined change in internal pressure of the fuel tank.

14. An apparatus according to claim 13, wherein said control unit determines the change in internal pressure of the fuel tank by (i) storing the internal pressure of the fuel tank at the time when the exhaust of the fuel evaporative emission is completed, (ii) determining when the internal pressure of the fuel tank increases by a predetermined pressure from the internal pressure of the fuel tank at the time when the exhaust of the fuel evaporative emission is completed, and (iii) measuring an elapsed time taken for the internal pressure of the fuel tank to increase by the predetermined pressure from the internal pressure of the fuel tank at the time when the exhaust of the fuel evaporative emission is completed; and wherein said control unit judges that the fuel evaporative emission treatment system has a fault if said elapsed time measured is less than a predetermined value.

15. An apparatus according to claim 13, wherein said control unit determines the change in internal pressure of the fuel tank by storing the internal pressure of the fuel tank at the time when the exhaust of the fuel evaporative emission is completed, and storing the internal pressure of the fuel tank at a point of time when a set time elapses from the point of time when the exhaust of the fuel evaporative emission is completed; and wherein said control unit judges that the fuel evaporative emission treatment system has a fault if the internal pressure of the fuel tank which is stored when said set time has elapsed exceeds the internal pressure of the fuel tank which is stored when the exhaust of the fuel evaporative emission is completed by a predetermined value or more.

16. An apparatus for detecting faults in a fuel evaporative emission treatment system, comprising:

a canister adsorbing fuel evaporative emission in a fuel tank;

a vent port controlling the admission of atmospheric air into the canister, the admitted atmospheric air separating the fuel evaporative emission from the canister;

a control valve controlling the feed of separated fuel evaporative emission from the canister to a suction pipe of an engine;

a pressure sensor for measuring an internal pressure of the fuel tank;

a control unit for controlling the open and close state of the vent port and the control valve based on the measured internal pressure, said control unit (a) causing a reduction in the internal pressure of the fuel tank below a first predetermined pressure by exhausting the fuel evaporative emission in the fuel tank to obtain a constant internal pressure, (b) measuring an elapsed time from a point of time when the exhaust of the fuel evaporative emission in the fuel tank is completed to a point of time when the internal pressure of the fuel tank reaches a second predetermined pressure which is higher than said first predetermined pressure and lower than the atmospheric pressure;

(c) judging a fault in the fuel evaporative emission treatment system if said elapsed time measured is less than a predetermined value.

17. An apparatus for detecting faults in a fuel evaporative emission treatment system, comprising:

a canister adsorbing fuel evaporative emission in a fuel tank;

a vent port controlling the admission of atmospheric air into the canister, the admitted atmospheric air separating the fuel evaporative emission from the canister;

a control valve controlling the feed of separated fuel evaporative emission from the canister to a suction pipe of an engine;

a pressure sensor for measuring an internal pressure of the fuel tank;

a control unit for controlling the open and close state of the vent port and the control valve based on the measured internal pressure, said control unit (a) causing a reduction in the internal pressure of the fuel tank below a first predetermined pressure by exhausting the fuel evaporative emission in the fuel tank to obtain a constant internal pressure, (b) storing the internal pressure of the fuel tank at the time when a predetermined time elapses from a point of time when the exhaust of the fuel evaporative emission in the fuel tank is completed, and (c) judging that the fuel evaporative emission treatment system has a fault if the internal pressure of the fuel tank which is detected when said predetermined time elapses exceeds a predetermined value.

18. An apparatus for detecting faults in a fuel evaporative emission treatment system, comprising:

a canister adsorbing fuel evaporative emission in a fuel tank;

a vent port controlling the admission of atmospheric air into the canister, the admitted atmospheric air separating the fuel evaporative emission from the canister;

a control valve controlling the feed of separated fuel evaporative emission from the canister to a suction pipe of an engine;

a pressure sensor for measuring an internal pressure of the fuel tank;

a control unit for controlling the open and close state of the vent port and the control valve based on the measured internal pressure, said control unit (a) causing a reduction in the internal pressure of the fuel tank by exhausting the fuel evaporative emission in the fuel tank to obtain a constant internal pressure, (b) judging that the fuel evaporative emission treatment system has a fault based on a comparison of the internal pressure measured after the reduction in internal pressure and a predetermined pressure.

* * * * *